(12) United States Patent
Fiorucci et al.

(10) Patent No.: US 8,316,679 B2
(45) Date of Patent: Nov. 27, 2012

(54) BORONIZED LAYING PIPE

(75) Inventors: Keith Fiorucci, Sturbridge, MA (US); Chris Lashua, Gardner, MA (US)

(73) Assignee: Siemens Industry, Inc., Alpharetta, GA (US)

(*) Notice: Subject to any disclaimer, the term of this patent is extended or adjusted under 35 U.S.C. 154(b) by 200 days.

(21) Appl. No.: 12/897,083

(22) Filed: Oct. 4, 2010

(65) Prior Publication Data
US 2012/0079862 A1  Apr. 5, 2012

(51) Int. Cl.
*B21D 11/00* (2006.01)
*B21F 3/02* (2006.01)
*B21C 47/10* (2006.01)

(52) U.S. Cl. .............. 72/66; 72/135; 242/361

(58) Field of Classification Search .......... 72/66, 67, 72/135, 371; 242/361–361.4
See application file for complete search history.

(56) References Cited

U.S. PATENT DOCUMENTS

| | | |
|---|---|---|
| 2,801,187 A | 7/1957 | Philippe |
| 3,090,702 A | 5/1963 | Commanday et al. |
| 3,286,684 A | 11/1966 | Aves |
| 3,673,005 A | 6/1972 | Kunst et al. |
| 3,787,245 A | 1/1974 | Kunst |
| 3,842,921 A | 10/1974 | Dill et al. |
| 3,891,474 A | 6/1975 | Grange |
| 3,922,038 A | 11/1975 | Scales |
| 3,923,348 A | 12/1975 | Peck |
| 3,936,327 A | 2/1976 | Fichtl |
| 4,074,553 A | 2/1978 | Woodrow |
| 4,126,488 A | 11/1978 | Kunst et al. |
| 4,237,184 A | 12/1980 | Gonseth et al. |
| 4,389,439 A | 6/1983 | Clark et al. |
| 4,495,005 A | 1/1985 | Aves, Jr. |
| 4,495,006 A | 1/1985 | Aves, Jr. |
| 4,539,053 A | 9/1985 | Aves, Jr. |
| 5,455,068 A | 10/1995 | Aves et al. |
| 5,839,684 A | 11/1998 | Poloni et al. |
| 6,098,909 A | 8/2000 | Meyer et al. |

FOREIGN PATENT DOCUMENTS

| | | |
|---|---|---|
| DE | 19749446 A1 | 7/1998 |
| EP | 1539390 | 8/2006 |
| JP | 63295014 A | 12/1988 |

OTHER PUBLICATIONS

Thermal Processing-Boronizing, www.bodycote.com, 2002, 2 pages, Bodycote, USA.
Boronizing Process Improves Abrasion Erosion Corrosion Resistance, EndurAlloy, www.endurancetechnologies.com/endurAlloy.php, retrieved Jun. 1, 2010, 2 pages, USA.
Boronizing-Titankote B, www.richterprecision.com/boronizing.html, retrieved Jun. 1, 2010, 2 pages, Richter Precision Inc., USA.
PCT International Search Report mailed Dec. 9, 2011 corresponding to PCT International Application No. PCT/US2011/050314 filed Sep. 2, 2011 (12 pages).

*Primary Examiner* — Teresa M Ekiert

(57) ABSTRACT

A laying pipe for use in the laying head of a rolling mill is configured for rotation about an axis, with an entry end aligned on that axis to receive a hot rolled product, and with a curved section leading to a delivery end spaced radially from that axis. The curved section defines a guide path configured to form the hot rolled product into a helical formation of rings. The laying pipe comprises a tubular ferrous wall having an interior surface comprising a wear resistant boronized layer against which the hot rolled product is confined for movement along the guide path.

12 Claims, 2 Drawing Sheets

BORONIZED LAYING PIPE

FIELD OF THE INVENTION

This invention relates generally to the laying pipes employed in rolling mill laying heads to form hot rolled products into helical ring formations, and is concerned in particular with improving the resistance of such pipes to frictional wear caused by contact with the hot rolled products.

BACKGROUND DISCUSSION

In a typical rod rolling mill, as depicted diagrammatically in FIG. 1, billets are reheated in a furnace 10. The heated billets are extracted from the furnace and rolled through a roughing mill 12, an intermediate mill 14, and a finishing mill 16 followed in some cases by a reducing/sizing mill (not shown). The finished products are then directed to a laying head 18 where they are formed into rings 20. The rings are deposited on a conveyor 22 for transport to a reforming station 24 where they are gathered into coils. While in transit on the conveyor, the rings are subjected to controlled cooling designed to achieve selected metallurgical properties.

As depicted diagrammatically in FIG. 2, the laying head 18 includes a hollow quill 26 containing a curved laying pipe 28. A bevel gear set 30 powered by a motor 32 serves to rotatably drive the quill and laying pipe about an axis "A".

Over the last several decades, the delivery speeds of rod rolling mills have increased dramatically. For example, mills now have the capability of rolling 5.5 mm rod at speeds of 110 m/sec. and higher. At such speeds, the hot rolled products exert a punishing effect on the laying pipes, causing internal pipe surfaces to undergo rapid localized wear and premature failure. Also, as the laying pipes wear, their ability to deliver a stable ring pattern to the conveyor 22 deteriorates. Unstable ring patterns disturb cooling uniformity and also contribute to coiling mishaps, commonly referred to as "cobbling", at the reforming station. Frequent and costly mill shutdowns are required to replace prematurely worn laying pipes and to address problems associated with cobbling at the reforming station.

Those skilled in the art have made repeated attempts at increasing the useful life of laying pipes. For example, as disclosed in U.S. Pat. Nos. 4,074,553 and 5,839,684, it has been proposed to line the laying pipes with wear resistant inserts. U.S. Pat. No. 6,098,909 discloses a different approach where the laying pipe is eliminated in favor of a guide path defined by a spiral groove in the outer surface of a conical insert enclosed by a conical outer casing, with the insert being rotatable within the outer casing to gradually shift the wear pattern on the inner surface of the outer casing.

For various reasons, none of these approaches has proven to be a practical solution to the problem of premature pipe wear.

Attempts have also been made at carburizing the interior pipe surfaces in order to increase hardness and resistance to wear. However, the carburizing process requires a drastic quenching from elevated processing temperatures, which can distort the pipe curvature. Carburized layers have also been found to be relatively brittle and to temper down at elevated temperatures resulting from exposure to the hot rolled products.

For a number of years, it has been well accepted that laying pipes with reduced bore sizes provide a number of significant advantages. By radially constricting the hot rolled products within a smaller space, guidance is improved and the ring pattern delivered to the cooling conveyor is more consistent, making it possible to roll at higher speeds. Unfortunately, however; these advantages have been offset to a large extent by significantly accelerated pipe wear. Thus, in the past, those skilled in the art have deemed it necessary to compromise by employing larger bore laying pipes and rolling at reduced speeds below the rated design speeds of the mills.

SUMMARY OF THE INVENTION

A primary objective of the present invention is to increase the resistance of laying pipes to frictional wear occasioned by contact with hot rolled products, and thereby increase the useful life of such pipes.

A companion objective of the present invention is to make it possible to reduce the bore size of the laying pipes and thereby improve product guidance and the consistency of ring formation resulting from such bore size reductions.

The aforesaid objectives are achieved by subjecting the laying pipe to a boronizing process in which boron atoms are diffused into the interior pipe surface to provide a wear resistant boronized layer.

DETAILED DESCRIPTION

Figure 1:
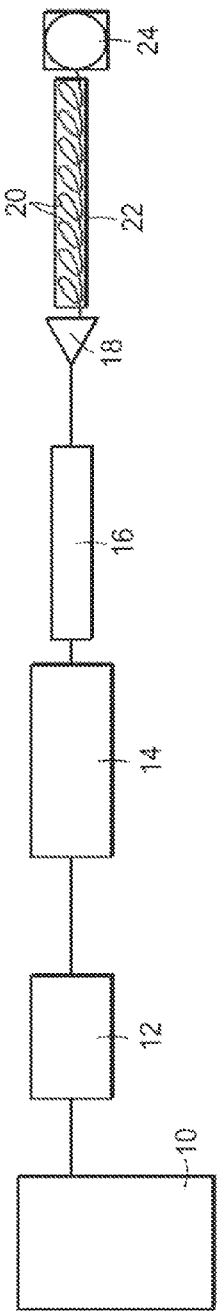
FIG. 1 is a diagrammatic illustration of a typical rolling mill layout.
Figure 2:
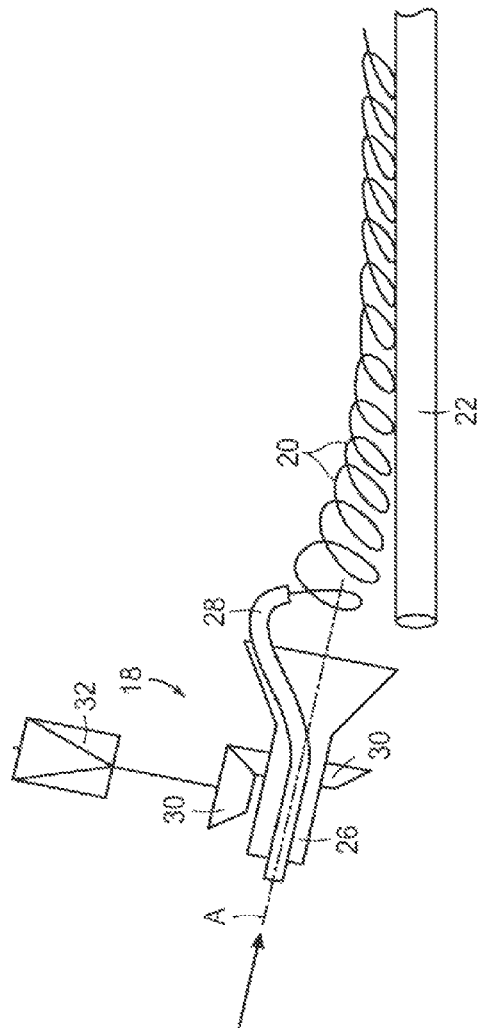
FIG. 2 diagrammatically illustrates the mill laying head and associated mill components.
Figure 3:
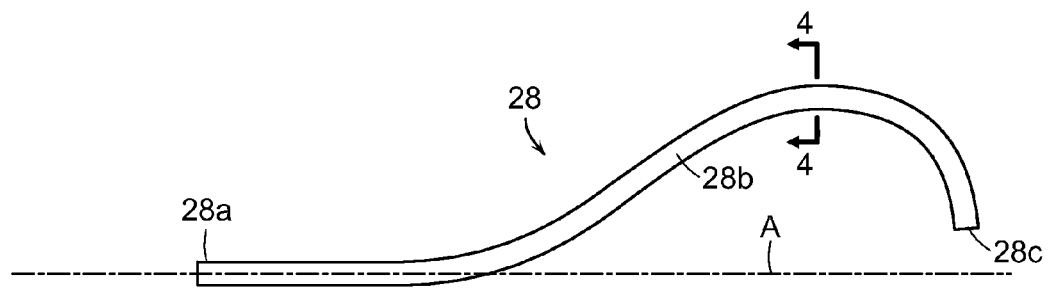
FIG. 3 is a side elevated view of a laying pipe in accordance with the present invention.
Figure 4:
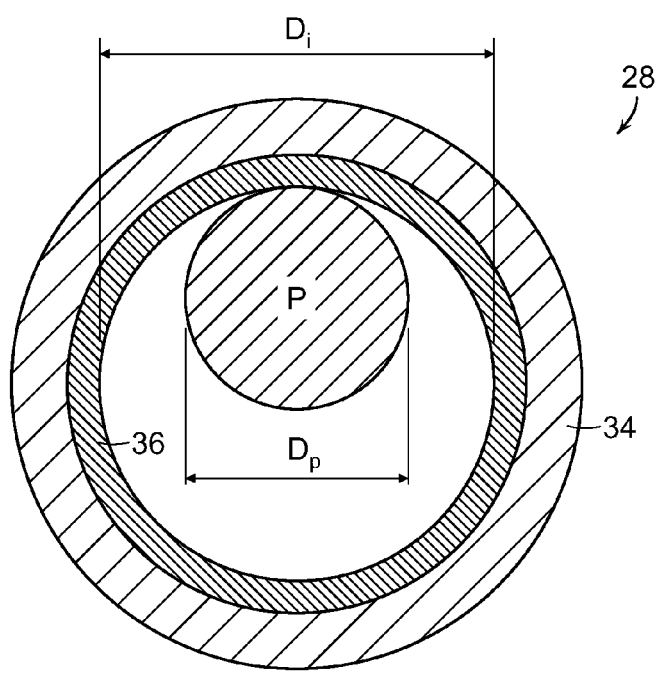
FIG. 4 is a cross sectional view on an enlarged scale taken along line 4-4 of FIG. 3, showing a product being guided by the laying pipe, and with dimensions exaggerated for purposes of illustration.

With reference to FIGS. 3 and 4, a laying pipe 28 in accordance with the present invention is configured for rotation about axis A. The pipe has an entry and 28a aligned on axis A to receive a hot rolled product, with a curved section 28b leading to a delivery end 28c spaced radially from axis A. The curved section defines a guide path configured to form the product into a helical formation of rings (as shown at 20 in FIGS. 1 and 2). As shown in FIG. 4, the laying pipe comprises a ferrous wall 34, with an interior surface layer 36 against which a hot rolled product P is confined for movement along the guide path defined by the pipe. The ferrous wall 34 has a hardness of between about 330-430 knoop ($HK_{100}$). The interior surface layer 36 comprises a wear resistant boronized layer with an elevated hardness of between about 1600-2300 knoop ($HK_{100}$).

The boronized layer 36 results from subjecting the interior pipe surface to a thermochemical treatment in which boron atoms are diffused into the interior surface of the ferrous wall 34.

The laying pipe 28 is formed by heating a straight ferrous tube to an elevated temperature of between about 840-1050° C., then bending the tube into the desired shape of a laying pipe, and then cooling the thus bent tube back to ambient temperature. The boronized layer 36 may be formed on the interior tube surface either before or subsequent to the bending process.

The increase hardness of the boronized layer 36 dramatically increases resistance to frictional wear occasioned by contact with hot roll products passing through the laying pipe.

Admittedly, and as disclosed for example in U.S. Pat. No. 3,673,005 (Kunst); 4,389,439 (Clark et al); and U.S. Pat. No. 5,455,068 (Ayes et al), boronizing has been known since at least the early 1970's. Yet, prior to the present invention, no one thought to employ this process to improve the wear resistance of rolling mill laying pipes. This, despite all of the wear related problems that have plagued the rolling mill industry over the last several decades.

The increased hardness of the boronized layer 36, and its increased resistance to frictional wear, allows those skilled in the art to dramatically decrease the bore size of the laying pipe, with attendant improved guidance and ring formation at beneficially increased speeds. Thus, as depicted in FIG. 4, by boronizing the interior pipe surface, laying pipes with inside diameters $D_i$ of about 20 mm. can be used to coil products having diameters $D_p$ ranging from 4-12 mm. This is to be contrasted with what has heretofore been conventional practice, where laying pipes with inside diameters of about 34 mm. have been employed to coil the same range of product sizes.

We claim:

1. A laying pipe for use in the laying head of a rolling mill, said laying pipe configured for rotation about an axis, with an entry end aligned on said axis to receive a hot rolled product produced by said mill, and with a curved section leading to a delivery end spaced radially from said axis, said curved section defining a guide path configured to form the hot rolled product exiting from said delivery end into a helical formation of rings, said laying pipe comprising a tubular metal wall having an exterior surface and an interior surface against which said hot rolled product is confined for movement along said guide path, wherein both of said surfaces comprise wear resistant boronized layers.

2. The laying pipe of claim 1, wherein said boronized layers are the result of a thermochemical treatment in which boron atoms are diffused into said surfaces.

3. The laying pipe of claim 1, wherein the hardness of said tubular metal wall is between about 330 to 430 knoop ($HK_{100}$), and wherein said boronized layers have an increased hardness of between about 1600 to 2300 knoop ($HK_{100}$).

4. The laying pipe of claim 1, wherein the metal of said tubular metal wall is selected from the group consisting of ferrous metals, nickel based alloys, titanium based alloys and cobalt based alloys.

5. The laying pipe of claim 1, further comprising a second tubular metal wall surrounding said first mentioned tubular metal wall, with additional boronized layers on at least one of the interior and exterior surfaces of said second tubular metal wall.

6. The laying pipe of claim 5, wherein both of the interior and exterior surfaces of said second tubular metal wall comprise wear resistant boronized layers.

7. A laying pipe for use in the laying head of a rolling mill, said laying pipe being configured for rotation about an axis, with an entry end aligned on said axis to receive a hot rolled product produced by said mill, and with a curved section leading to a delivery end spaced radially from said axis, said curved section defining a guide path configured to form the hot rolled product exiting from said delivery end into a helical formation of rings, said laying pipe comprising a tubular metal wall having an exterior surface and an interior surface against which said hot rolled product is confined for movement along said guide path, both of said surfaces comprises wear resistant boronized layers,
wherein the hardness of said tubular metal wall is between about 330 to 430 knoop ($HK_{100}$), wherein said boronized layer has an increased hardness of between about 1600 to 2300 knoop ($HK_{100}$), and wherein said boronized layers are the result of a thermochemical treatment in which boron atoms are diffused into the said surfaces.

8. The laying pipe of claim 7, further comprising a second tubular metal wall surrounding said first mentioned tubular metal wall, with additional boronized layers on at least one of the interior and exterior surfaces of said second tubular metal wall.

9. The laying pipe of claim 8, wherein both of the interior and exterior surfaces of said second tubular metal wall comprise wear resistant boronized layers.

10. A laying pipe for use in the laying head of a rolling said laying pipe being configured for rotation about an axis, with an entry end aligned on said axis to receive a hot rolled product produced by said mill, and with a curved section leading to a delivery end spaced radially from said axis, said curved section defining a guide path configured to form the hot rolled product exiting from said delivery end into a, helical formation of rings, said laying pipe comprising a tubular metal wall having an exterior surface and an interior surface against which said hot rolled product is confined for movement along said guide path, both of said surfaces comprises wear resistant boronized layers, wherein the metal of said tubular wall is selected from the group consisting of ferrous metals, nickel based alloys, titanium based alloys and cobalt based alloys, wherein the hardness of said tubular metal wall is between about 330 to 430 knoop ($HK_{100}$), and wherein said boronized layers have an increased hardness of between about 1600 to 2300 knoop ($HK_{100}$).

11. The laying pipe of claim 10, further comprising a second tubular metal wall surrounding said first mentioned tubular metal wall, with additional boronized layers on at least one of the interior and exterior surfaces of said second tubular metal wall.

12. The laying pipe of claim 11, wherein both of the interior and exterior surfaces of said second tubular metal wall comprise wear resistant boronized layers.

* * * * *